(12) United States Patent
Kim et al.

(10) Patent No.: US 10,464,004 B2
(45) Date of Patent: Nov. 5, 2019

(54) BAG FILTER FILTRATION AND DUST COLLECTING APPARATUS FOR PREVENTING DUST ACCUMULATION

(71) Applicant: LG CHEM, LTD., Seoul (KR)

(72) Inventors: Hyung-Sop Kim, Daejeon (KR); Won-Chan Park, Daejeon (KR); Yong-Jin Baek, Daejeon (KR); Jong-Oh Won, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 15/560,321

(22) PCT Filed: Jul. 26, 2016

(86) PCT No.: PCT/KR2016/008169
§ 371 (c)(1),
(2) Date: Sep. 21, 2017

(87) PCT Pub. No.: WO2017/018784
PCT Pub. Date: Feb. 2, 2017

(65) Prior Publication Data
US 2018/0065071 A1   Mar. 8, 2018

(30) Foreign Application Priority Data

Jul. 27, 2015 (KR) .................. 10-2015-0105783

(51) Int. Cl.
*B01D 46/00* (2006.01)
*B01D 46/02* (2006.01)
(Continued)

(52) U.S. Cl.
CPC ....... *B01D 46/023* (2013.01); *B01D 46/0043* (2013.01); *B01D 46/02* (2013.01);
(Continued)

(58) Field of Classification Search
CPC .................. B01D 46/00–546; Y02A 50/2355
(Continued)

(56) References Cited

U.S. PATENT DOCUMENTS

| | | | |
|---|---|---|---|
| 3,831,354 A | 8/1974 | Bakke | |
| 5,938,818 A | 8/1999 | Miller | |
| 6,036,751 A * | 3/2000 | Ribardi | B01D 46/0068 220/203.01 |

FOREIGN PATENT DOCUMENTS

| | | |
|---|---|---|
| JP | S48-71474 U | 9/1973 |
| JP | S48-79584 U | 9/1973 |

(Continued)

OTHER PUBLICATIONS

International Search Report and Written Opinion issued in International Application No. PCT/KR2016/008169 dated Nov. 25, 2016, 9 pages.

(Continued)

*Primary Examiner* — T. Bennett McKenzie
(74) *Attorney, Agent, or Firm* — Rothwell, Figg, Ernst & Manbeck, P.C.

(57) ABSTRACT

A bag filter filtration and dust collecting apparatus according to the present invention is a bag filter filtration and dust collecting apparatus using a bag filter for collecting dust and the like from supplied polluted air and then discharging the dust and the like to the outside, and the bag filter filtration and dust collecting apparatus comprises: an upper case in which a plurality of bag filters for filtering dust are installed in the vertical direction; a lower case, formed at a lower end of the upper case, which collects dust that falls from the bag filter; and at least two mutually parallel air supply pipes, passing through the lower case, which supply polluted air into the bag filter filtration and dust collecting apparatus, wherein the air supply pipe is provided with a side discharge hole formed on the side thereof whereby the air spray is (Continued)

directed toward the inner side wall of the upper case or the lower case, and accordingly, a central space between the at least two air supply pipes forms a region in which dust can fall.

20 Claims, 25 Drawing Sheets

(51) Int. Cl.
  *B01D 46/04* (2006.01)
  *B01D 46/48* (2006.01)
(52) U.S. Cl.
  CPC ............. *B01D 46/04* (2013.01); *B01D 46/48* (2013.01); *B01D 46/002* (2013.01); *B01D 46/0019* (2013.01); *Y02A 50/2355* (2018.01)
(58) Field of Classification Search
  USPC ............. 55/282–305, 341.1–341.7, 361–382
  See application file for complete search history.

(56) References Cited

FOREIGN PATENT DOCUMENTS

| | | |
|---|---|---|
| JP | S50-26170 | 3/1975 |
| JP | S51-42172 | 4/1976 |
| JP | S57-25717 U | 2/1982 |
| JP | H08-108026 | 4/1996 |
| KR | 10-2006-0040192 A | 5/2006 |
| KR | 10-2009-0064635 A | 6/2009 |
| KR | 10-0977510 B1 | 8/2010 |
| KR | 10-2014-0142979 A | 12/2014 |
| WO | 2007/142406 A | 12/2007 |
| WO | 2015/039069 A | 3/2015 |

OTHER PUBLICATIONS

Extended European Search Report in corresponding European application EP16830817.9 dated Nov. 26, 2018, 8 pages.

* cited by examiner

FIG. 1
-Prior Art-
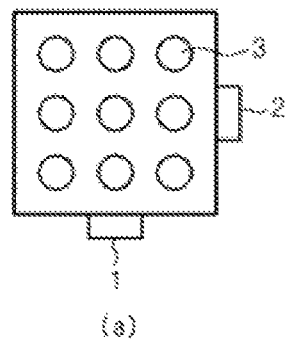
(a)
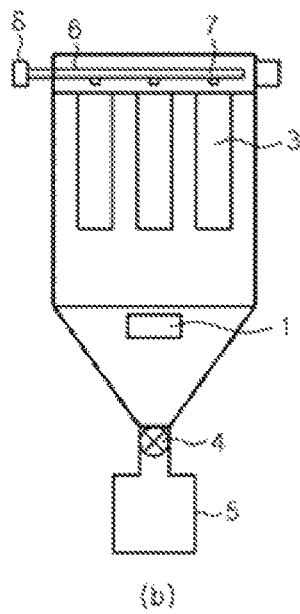
(b)

FIG. 13
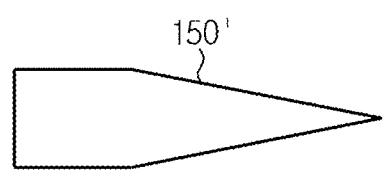
(a)
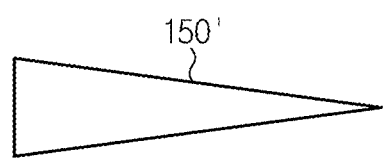
(b)
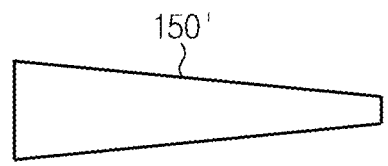
(c)

BAG FILTER FILTRATION AND DUST COLLECTING APPARATUS FOR PREVENTING DUST ACCUMULATION

CROSS-REFERENCE TO RELATED APPLICATIONS

This application is a 35 U.S.C. § 371 National Phase Entry Application from PCT/KR2016/008169, filed on Jul. 26, 2016, and designating the United States, which claims priority under 35 U.S.C. § 119 to Korean Patent Application No. 10-2015-0105783, filed on Jul. 27, 2015, the entire disclosures of which are incorporated herein by reference.

TECHNICAL FIELD

The present disclosure relates to a bag filter dust collector used to trap particulate contaminants including dust released from various types of industrial facilities, and more particularly, to a bag filter dust collector that can solve the problem with dust accumulated and left un-dislodged on the inner wall.

BACKGROUND ART

Generally, exhaust gases released from various types of industrial facilities include fine particles. To remove particulate contaminants from exhaust gases, devices such as a cyclone and a bag filter dust collector are used. When exhaust gases pass through the cyclone, larger and heavier dust is captured, and un-captured smaller and lighter dust is collected by the bag filter dust collector. The bag filter dust collector is designed to separate solids from gases through a filter, and generally the bag filter can filter out dust down to 0.1 μm in size.

FIG. 1 shows a conventional bag filter dust collector, called a bag housing, including a bag filter and a blower, and the conventional art is described below with reference to the drawing.

In FIG. 1, (a) is a top view and (b) is a side view. Dust laden air entering through an inlet 1 beneath passes through a bag filter 3 at an upper part, so that dust is trapped on the surface of the bag filter 3, and purified air is discharged through an outlet 2 on the top via the bag filter 3.

The bag filter dust collector has high dust collection efficiency, but in the course of filtering, dust layers trapped in a filter cloth become thicker and a pressure loss increases, so it is necessary to blow dust on the surface of the bag filter by periodic cleaning operation. The cleaning operation mainly employs a cleaning apparatus using compressed air including a compression air tank 8, a blow pipe 6 and nozzles 7, and is performed by blasting compressed air having strong energy into the bag filter through the nozzles 7 to blow off dust attached to the surface of the bag filter 3, and consequentially reduce a pressure loss. In this instance, if cleaning is inadequate, compressed air blasted for cleaning is adjusted such that the pressure of compressed air is higher or the blasting cycle of compressed air is shorter.

The cleaning operation is performed at a predetermined time interval to cause dust on the surface of the bag filter to fall down and be gathered in a dust reservoir 5 through a dust discharge device 4, and eventually, to be forced outwards. However, while dust is falling, some may be attached to the inner wall, and if dust build-up on the inner wall continues and is not properly removed, an outlet may be clogged in the end. To solve the problem, an air knocker or a vibrator is generally used, and in this case, there is a dedusting effect at certain areas, but adjacent facility is damaged by vibration.

DISCLOSURE

Technical Problem

The present disclosure is designed to solve the problem, and therefore, the present disclosure is directed to providing a bag filter dust collector that can solve the problem with dust accumulated and left un-dislodged on the inner wall.

Technical Solution

To achieve the object, a bag filter dust collector according to the present disclosure using a bag filter to trap dust from contaminated air being supplied and force the dust outwards includes an upper case in which multiple bag filters configured to filter out dust are installed in a vertical direction, a lower case formed at bottom of the upper case to collect dust falling from the bag filter, and two or more air supply pipes parallel to each other to supply contaminated air into the bag filter dust collector through the lower case, wherein the air supply pipe has a side discharge hole on a side surface to direct air blast toward an inner wall of a side surface of the upper case or the lower case, forming a dust fall zone at a central space between the two or more air supply pipes.

The air supply pipes may be installed side by side in a horizontal direction on a surface of the lower case in air supply directions matching with each other, or the air supply pipes may be installed, each one on opposing surfaces of the lower case, in air supply directions opposite to each other.

Furthermore, the air supply pipe may have a cylindrical shape with a closed end, and further include an end discharge hole at the closed end to blast the contaminated air. The end discharge hole may have a slot shape.

Additionally, the air supply pipe may further include a top slit opening to prevent dust build-up on top of an outer wall of the air supply pipe.

Furthermore, the air supply pipe may further include a bottom slit opening to prevent dust build-up on bottom of an inner wall of the air supply pipe.

The upper case may be a quadrangular column and the lower case may have a smaller area as it goes downward, and the upper case and the lower case may be integrally formed.

In an embodiment, the two or more air supply pipes are bent with ends facing each other in the bag filter dust collector. For example, the air supply pipes may have an L shape, facing each other.

In another example, the air supply pipes may be integrally formed with the bent ends connected to each other. For instance, the air supply pipes may have a U shape.

In addition to these configurations, the air supply pipes may be configured to blast the contaminated air toward remaining surfaces of the lower case except the surface through which the air supply pipes go.

The surface of the lower case through which the air supply pipes go may be erect, not inclined.

When a length of the surface of the lower case through which the air supply pipes go is L, the two or more air supply pipes are each preferably positioned at a distance of between 0.1 L and 0.3 L from two side surfaces of the lower case.

Preferably, the side discharge holes are opened from an angle of between 20 degrees and 40 degrees to an angle of between 40 degrees and 70 degrees relative to a horizontal plane from a center of the air supply pipe toward an inner wall of a side surface of the lower case, and an angle of the opened part is from 20 degrees to 50 degrees.

Furthermore, the side discharge holes may be vertically symmetrical with regard to the horizontal plane. That is, the side discharge holes may be formed at two (upper and lower) locations with respect to the horizontal plane.

The side discharge hole may have a slit shape with a constant size to an end of the air supply pipe.

The side discharge hole may have a tapered shape with width becoming narrower as it goes toward an end of the air supply pipe.

The side discharge hole may be multiple circular openings with diameter reducing as it goes toward an end of the air supply pipe.

The air supply pipe is preferably formed at or near a middle of a longitudinal length of the lower case.

The bag filter dust collector may further include a purging device to purge dust built up in the bag filter.

Advantageous Effects

According to the present disclosure, two or more air supply pipes are manufactured and installed to direct air blast toward the inner wall of the side surface of the bag filter dust collector, forming a dust fall zone at a central space between the air supply pipes. According to this configuration, air is only blasted to the wall of the bag filter dust collector and is not blasted to the region of dust fall between the air supply pipes. As the dust fall zone is formed at the central space by blasting air to the side surface, dust build-up on the wall of the bag filter dust collector can be effectively prevented.

By preventing dust build-up, the present disclosure can efficiently maintain the bag filter dust collector without causing any injury or damage to adjacent facility, and greatly save the maintenance and repair costs of the bag filter dust collector. The prevention of dust build-up is only accomplished by the design of the air supply pipes without changing the size of the bag filter dust collector, leading to dramatic installation cost savings and high efficiency dust collection.

Furthermore, prevention of dust build-up in the bag filter dust collector makes it possible to avoid re-scattering of accumulated dust and eventual dust re-buildup on the surface of the bag filter, and to eliminate the need to increase the pressure or shorten the blasting cycle in the course of periodic cleaning, thereby preventing the unnecessary consumption of the bag filter and saving the maintenance costs of the bag filter dust collector.

BRIEF DESCRIPTION OF THE DRAWINGS

FIG. 1 is a diagram showing configuration of a conventional bag filter dust collector of square shape.

FIGS. 12 to 14 are diagrams illustrating various examples of side discharge hole of air supply pipe of a bag filter dust collector according to an embodiment of the present disclosure.

MODE FOR CARRYING OUT THE INVENTION

Figure 2:
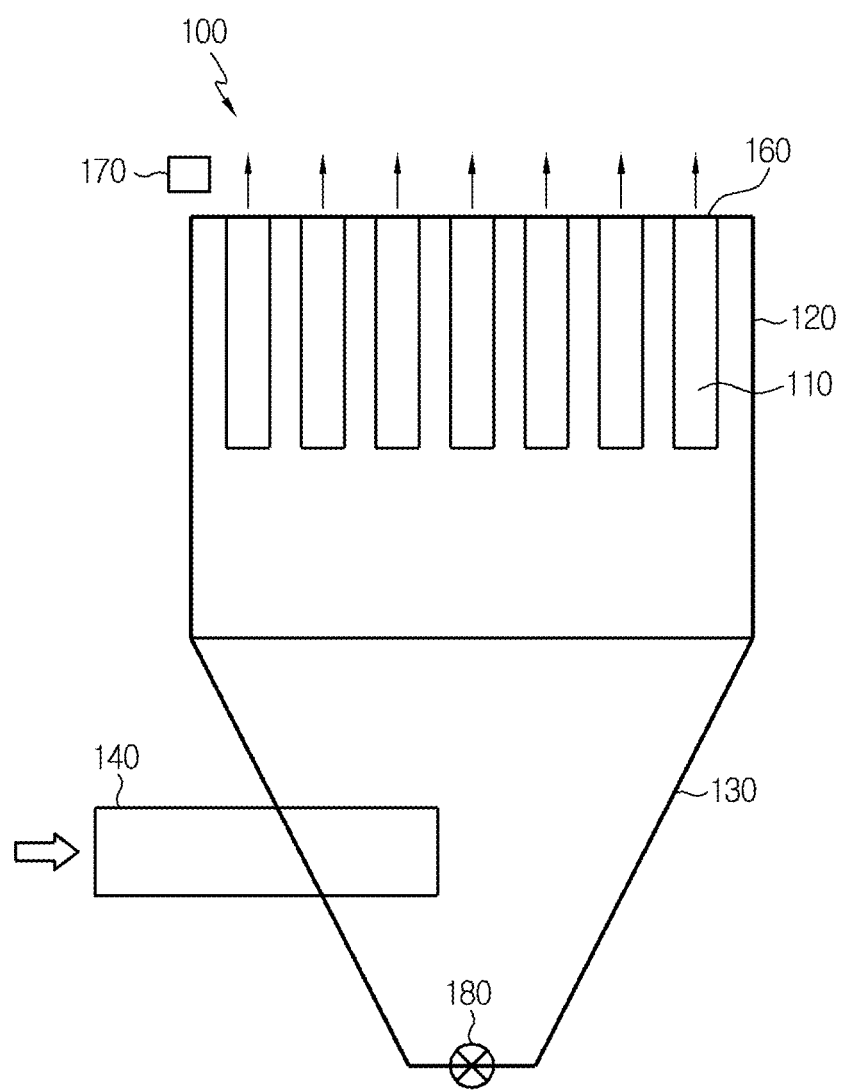
FIG. 2 is a side cross-sectional view of a bag filter dust collector according to the present disclosure.

Hereinafter, the preferred embodiments of the present disclosure will be described in detail with reference to the drawings. However, the present disclosure is not limited to the disclosed embodiment and will be embodied in different forms, and rather, these embodiments are provided to render the disclosure of the present disclosure complete and to help those skilled in the art fully understand the scope of the present disclosure. The embodiments stated herein and illustration in the drawings are just a most preferred embodiment of the present disclosure and do not fully represent the technical concept of the present disclosure, so it should be understood that there may be various equivalents and modifications for alternative embodiments at the time the application is filed.

Figure 3:
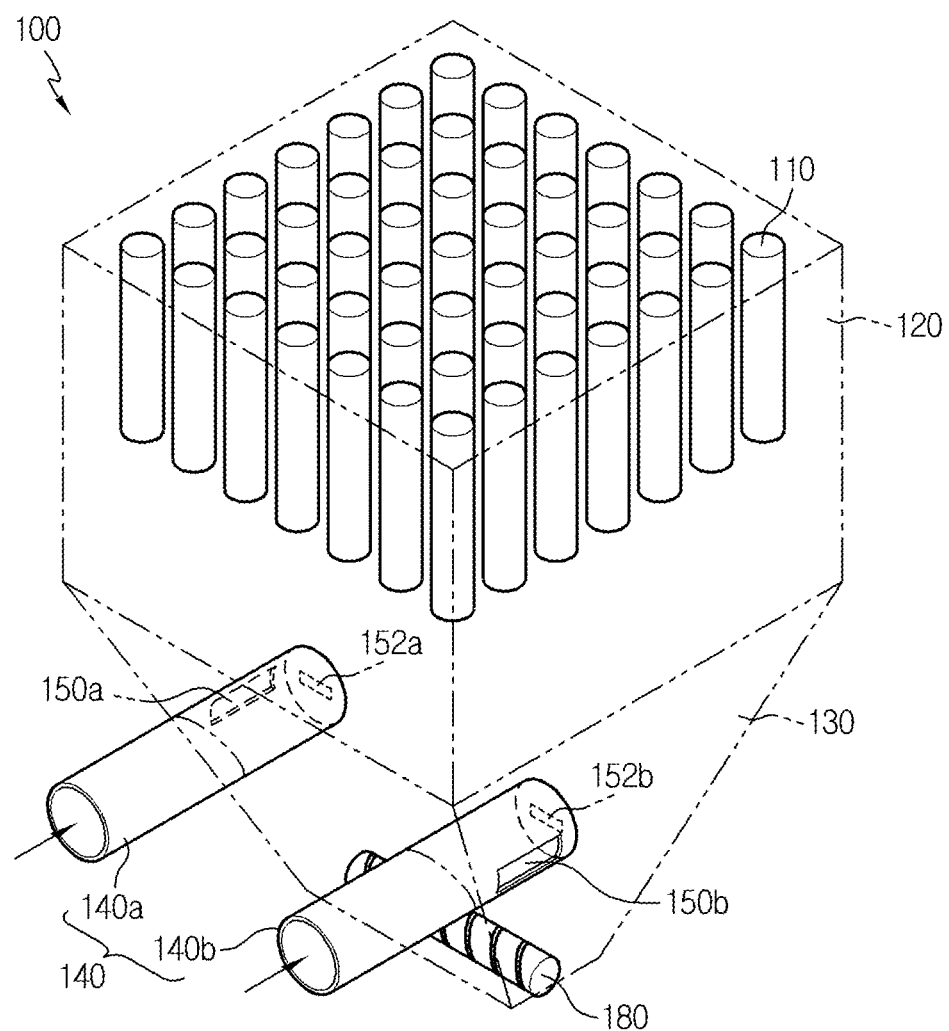
FIG. 3 is a perspective view of a bag filter dust collector according to an embodiment of the present disclosure.

FIG. 2 is a side cross-sectional view of a bag filter dust collector according to an embodiment of the present disclosure, and FIG. 3 is a perspective view of a bag filter dust collector according to an embodiment of the present disclosure. A detailed description of configuration and operation of the present disclosure with reference to FIGS. 2 and 3 is provided below.

Referring to FIG. 2 first, the bag filter dust collector 100 according to an embodiment of the present disclosure uses a bag filter 110 to trap dust from contaminated air being supplied and force the dust outwards, and includes an upper case 120 in which multiple bag filters 110 filtering out dust are installed in the vertical direction, a lower case 130 formed at the bottom of the upper case 120 to collect dust falling from the bag filter 110, and two or more air supply pipes 140 parallel to each other to supply contaminated air into the bag filter dust collector 100 through one surface of the lower case 130.

The upper case 120 may be an approximately quadrangular column and the lower case 130 may have a smaller area as it goes downward, and the upper case 120 and the lower case 130 may be integrally formed.

Preferably, the air supply pipes 140 are formed at or near the middle of the longitudinal length of the lower case 130. The air supply pipes 140 may be formed through one surface of the upper case 120, instead of the lower case 130. The air supply pipes 140 may include metal pipes, plastic pipes, and plastic pipes having a metal layer on at least part of the surface.

In the bag filter dust collector 100, while dust laden air entering through the air supply pipes 140 passes through the bag filter 110 at the upper part, dust is trapped on the surface of the bag filter 110, and purified air is discharged through an outlet 160 on the top via the bag filter 110.

The bag filter dust collector 100 may further include a purging device 170 to purge dust built-up in the bag filter 110. As described with reference to FIG. 1, the purging device 170 may be a conventional cleaning apparatus including a compression air tank, a blow pipe, and nozzles, and may further include a brush that can be mechanically manipulated to effectively blow out dust.

The purging device 170 may operate at a predetermined time interval to cause dust on the surface of the bag filter 110 to fall down and be discharged outward through a dust discharge device 180. The dust discharge device 180 may be, for example, a rotary valve.

The two or more air supply pipes 140 are installed side by side in the horizontal direction on one surface of the lower case 130. The air supply directions of the air supply pipes 140 match with each other.

Although this embodiment cites, as an example, the case in which two air supply pipes 140a, 140b are installed as can be seen in detail from FIG. 3, the number of air supply pipes may be three or more. As described above, the present disclosure is characterized in that the horizontal space of the bag filter dust collector is divided by multiple air supply pipes.

The air supply pipe 140a, 140b has a cylindrical shape with one closed end, and a side discharge hole 150a, 150b is formed on the side surface of the air supply pipe 140a, 140b to direct air blast toward the inner wall of the side surface of the upper case 120 or the lower case 130, i.e., the inner wall of the bag filter dust collector. Furthermore, the air supply pipe 140a, 140b may further include an end discharge hole 152a, 152b at the closed end to blast contaminated air. The end discharge hole 152a, 152b may have a slot shape, and there is no limitation on the number of end discharge holes 152a, 152b. The slot represents a hole or crevice having a certain width. The end discharge hole 152a, 152b can play a role in removing dust by blasting air in the flow direction as well.

Figure 4:
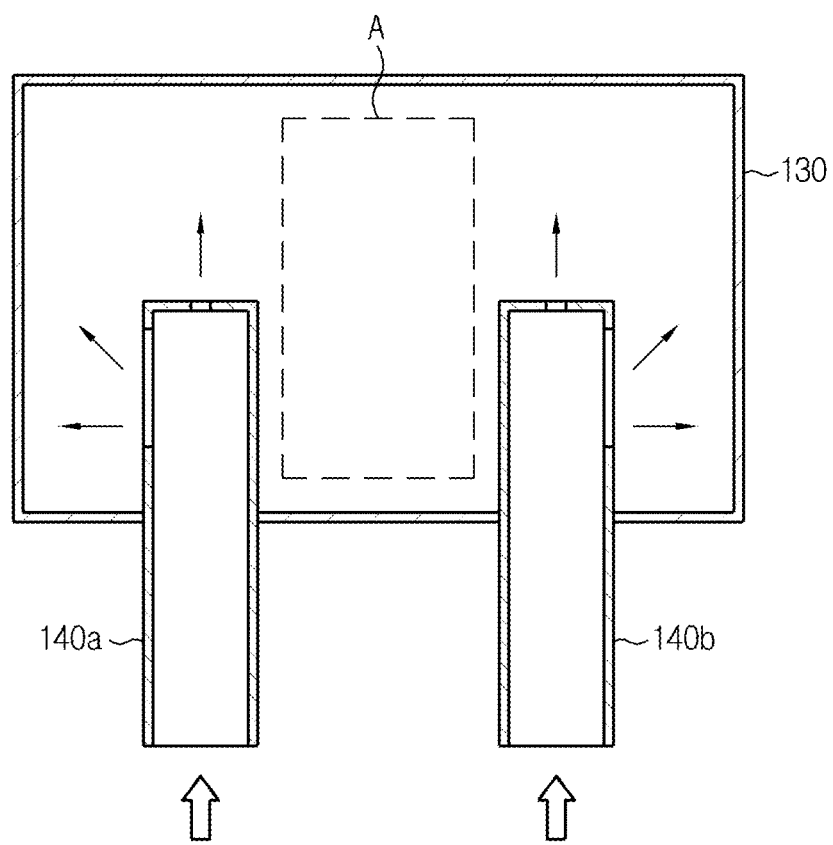
FIG. 4 is a plane view illustrating air blast from air supply pipe of a bag filter dust collector according to an embodiment of the present disclosure.
Figure 5:
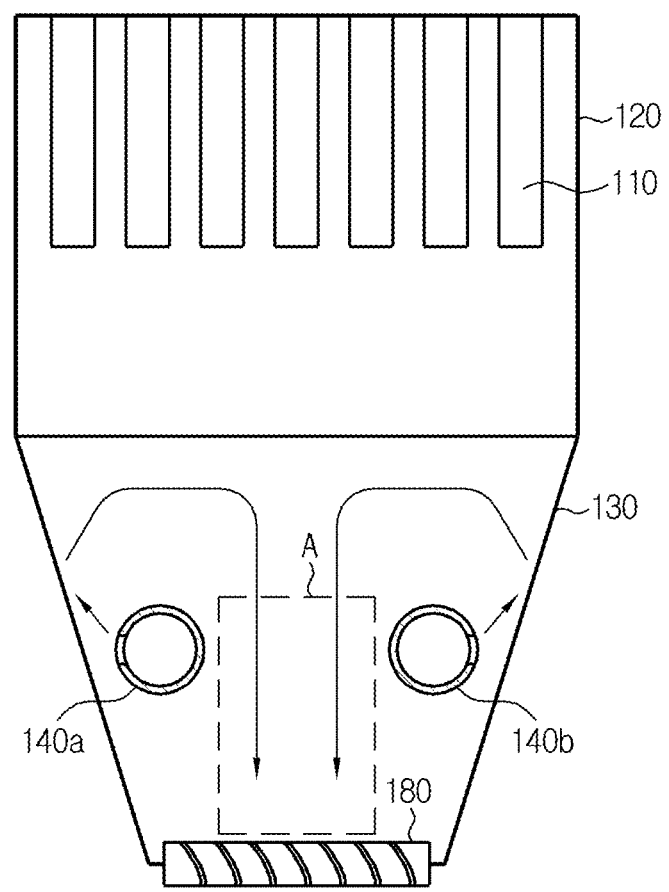
FIG. 5 is a front view illustrating air blast from air supply pipe of a bag filter dust collector according to an embodiment of the present disclosure.

FIG. 4 is a plane view illustrating air blast from air supply pipe of the bag filter dust collector according to an embodiment of the present disclosure, and FIG. 5 is a front view illustrating air blast from air supply pipe of the bag filter dust collector according to an embodiment of the present disclosure.

Referring to FIGS. 4 and 5, as previously described, air blast from the air supply pipes 140a, 140b is directed toward the wall of the side surface of the bag filter dust collector (solid arrow). According to this configuration, air is only blasted to the wall of the bag filter dust collector, and is not blasted to a central space A between the air supply pipes 140a, 140b.

As shown in FIG. 5 in greater detail, air is blasted in the direction indicated by the straight line arrow, striking the wall of the bag filter dust collector to generate a rotational flow as indicated by the curved arrow, with a dust fall zone at the central space A between the two or more air supply pipes 140a, 140b.

As multiple air supply pipes are installed and a dust fall zone is formed at the central space A between the air supply pipes in varying air blast directions, dust build-up on the wall of the bag filter dust collector can be effectively prevented.

Figure 6:
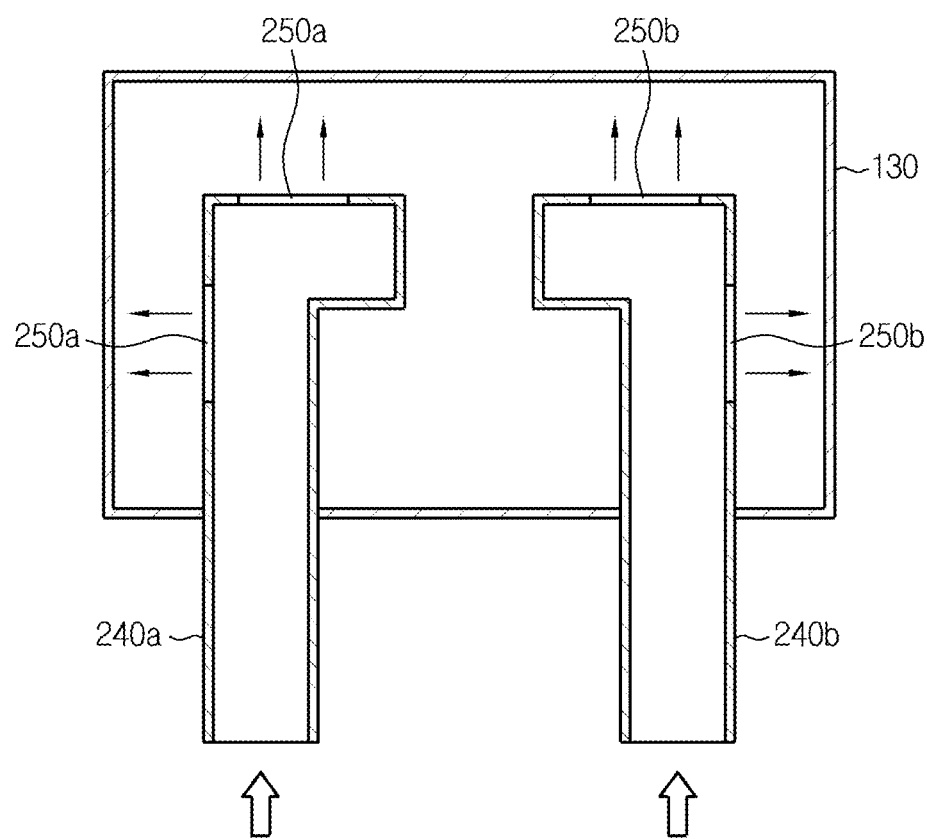
FIG. 6 is a plane view showing another example of air supply pipe of a bag filter dust collector according to an embodiment of the present disclosure.

FIG. 6 is a plane view showing another example of air supply pipe of the bag filter dust collector according to an embodiment of the present disclosure. In this embodiment, two or more air supply pipes 240a, 240b are bent with the ends facing each other in the bag filter dust collector. Side discharge holes 250a, 250b are formed at a straight portion and a bent portion on the side surface of the air supply pipes 240a, 240b along the shape of the air supply pipe 240a, 240b to direct air blast toward the inner wall of the side surface of the bag filter dust collector, so the air blast direction (solid arrow) also faces the side surface of the bag filter dust collector.

Figure 7:
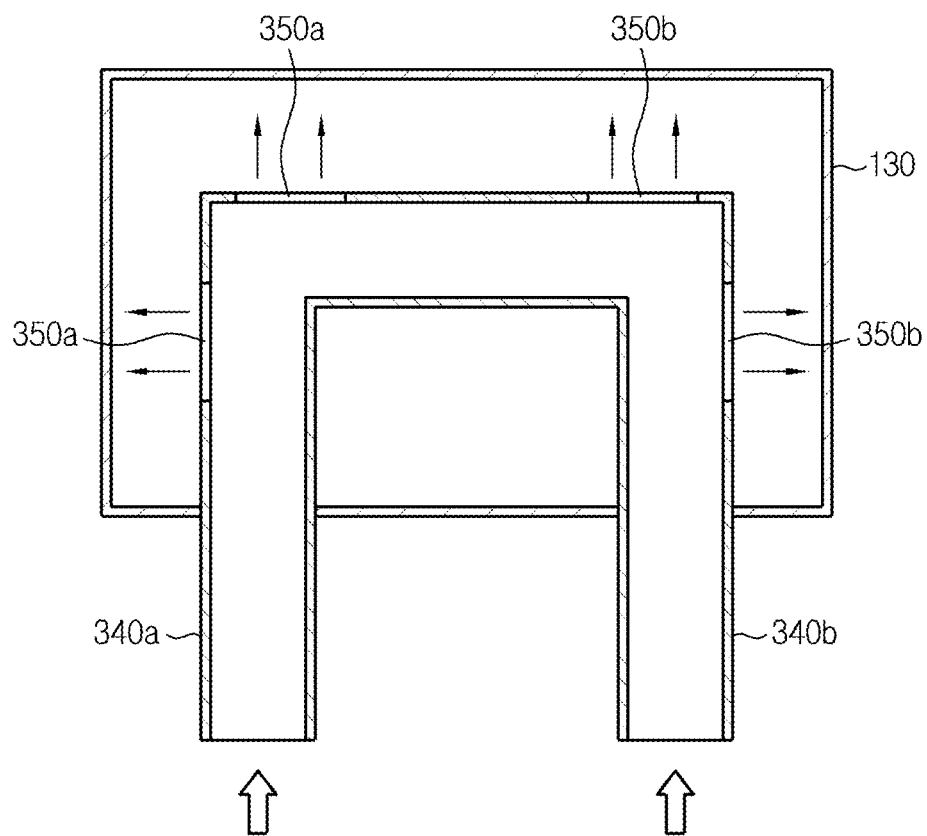
FIG. 7 is a plane view showing still another example of air supply pipe of a bag filter dust collector according to an embodiment of the present disclosure.

FIG. 7 is a plane view showing still another example of air supply pipe of the bag filter dust collector according to an embodiment of the present disclosure. In this embodiment, two or more air supply pipes 340a, 340b may be integrally formed such that they are bent with the ends facing each other in the bag filter dust collector and the bent ends are connected to each other. The bent ends may be connected to each other to allow for communication between. In this case, similarly, side discharge holes 350a, 350b are formed at a straight portion and a bent portion on the side surface of the air supply pipes 340a, 340b along the shape of the air supply pipe 340a, 340b to direct air blast toward the inner wall of the side surface of the bag filter dust collector, so the air blast direction (solid arrow) also faces the side surface of the bag filter dust collector.

The air supply pipe structure such as those shown in FIGS. 6 and 7 is advantageous in preventing dust build-up on the wall. For the bent portions of the air supply pipes 240a, 240b, 340a, 340b, bending a pipe per se may be employed, and connecting multiple pipes may be employed.

Figure 8:
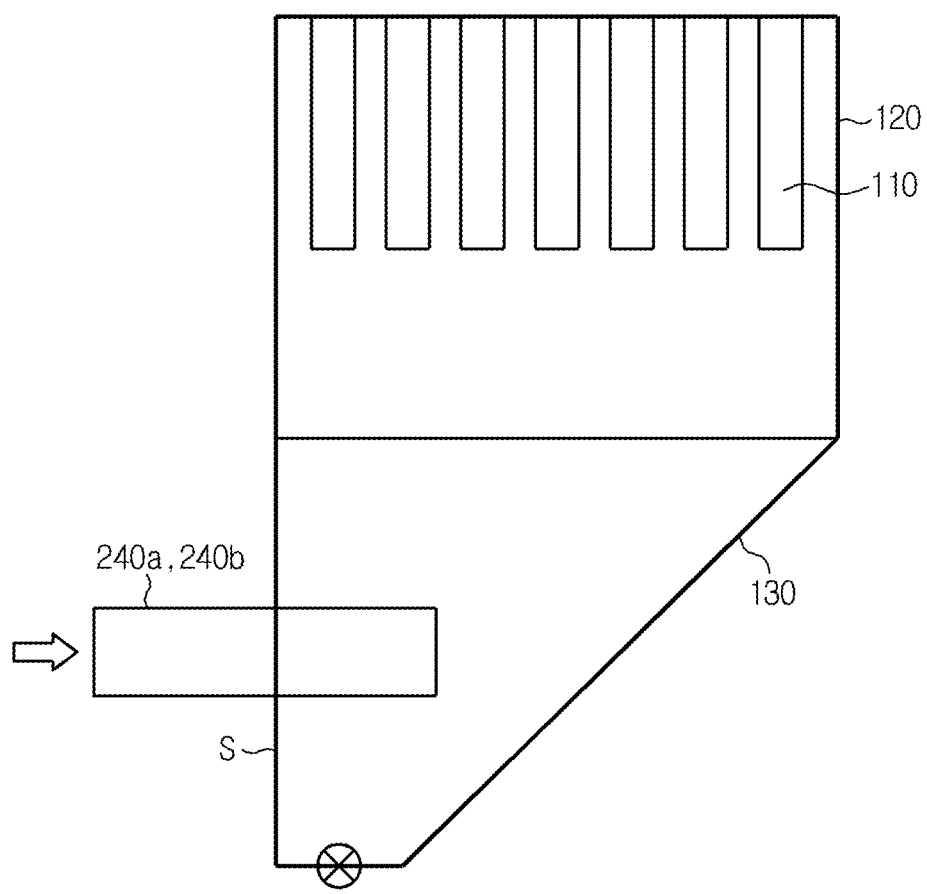
FIG. 8 is a side cross-sectional view showing another example of a bag filter dust collector according to an embodiment of the present disclosure.

FIG. 8 is a side cross-sectional view showing another example of a bag filter dust collector according to an embodiment of the present disclosure. In case that the air supply pipes 240a, 240b or 340a, 340b are constructed as shown in FIGS. 6 and 7, dust may build up on the area to which air is not blasted (one surface of the lower case through which the air supply pipes go), and if the surface S of the lower case 130 through which the air supply pipes 240a, 240b or 340a, 340b go is erect as shown in FIG. 8, dust build-up on the wall can be prevented.

Figure 9:
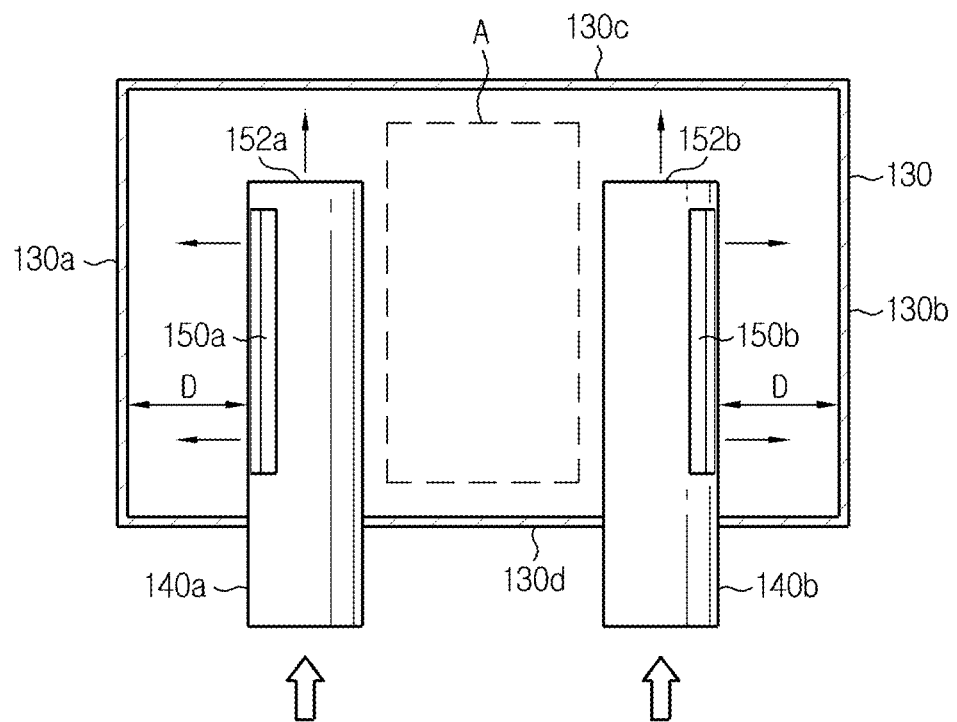
FIGS. 9 to 11 are diagrams illustrating side discharge hole of air supply pipe of a bag filter dust collector according to an embodiment of the present disclosure.
Figure 10:
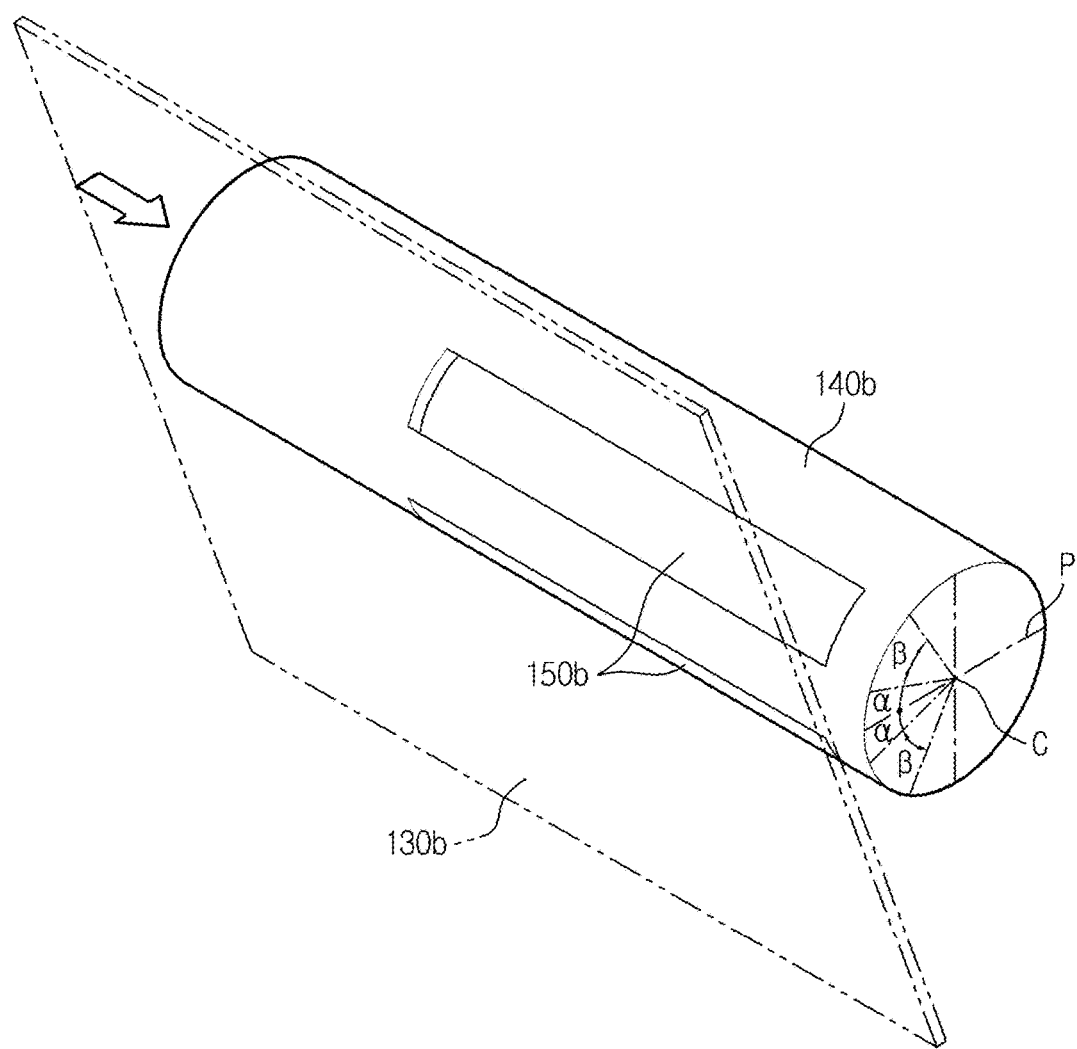
Figure 11:
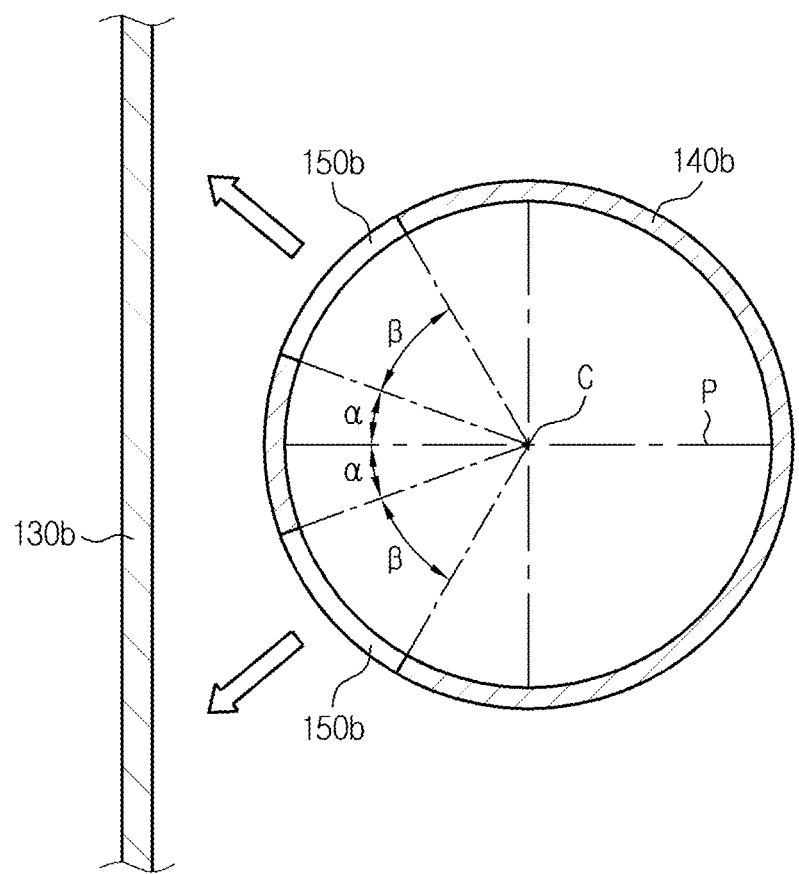

FIGS. 9 to 11 are diagrams illustrating side discharge hole of air supply pipe of a bag filter dust collector according to an embodiment of the present disclosure.

Referring to FIG. 9 first, when the length of the surface 130*d* of the lower case 130 through which the air supply pipes 140*a*, 140*b* go is L, each of the two or more air supply pipes 140*a*, 140*b* is preferably positioned at the distance D of between 0.1 L and 0.3 L from the two side surfaces 130*a*, 130*b* of the lower case 130. The air supply pipes 140*a*, 140*b* blast air toward the remaining surfaces 130*a*, 130*b*, 130*c* except the surface 130*d* of the lower case 130 through which the air supply pipes 140*a*, 140*b* go.

When the distance is smaller than 0.1 L, the air supply pipes are so close to the inner wall of the bag filter dust collector that a flow of contaminated air in the bag filter dust collector is reduced, making it difficult to effectively filter out contaminated air through the bag filter. When the distance is larger than 0.3 L, the size of the dust fall zone at the center is not enough. The distance D condition is determined, taking the flow analysis results in the bag filter dust collector into account, and is not a mere matter of design modification.

Subsequently, referring to FIGS. 10 and 11, the side discharge holes 150*b* are opened from an angle α of between 20 degrees and 40 degrees to an angle β of between 40 degrees and 70 degrees relative to a horizontal plane P from the center C of the air supply pipe 140*b* toward the inner wall of the side surface 130*b* of the lower case, and an angle θ of the opened part is preferably between 20 degrees and 50 degrees. When α is smaller than 20 degrees and β is smaller than 40 degrees, air blast is directed nearly toward the horizontal plane rather than the side surface, reducing a flow of contaminated air in the bag filter dust collector, which makes it difficult to effectively filter out contaminated air through the bag filter. When α is larger than 40 degrees and β is larger than 70 degrees, air blast is directed nearly toward the vertical direction rather than the side surface, reducing a flow of contaminated air in the bag filter dust collector, which makes it difficult to effectively filter out contaminated air through the bag filter. Furthermore, when θ is smaller than 20 degrees, the area of the opened part is not enough and the supply of contaminated air is not smooth, and when θ is larger than 50 degrees, contaminated air does not fully converge in a desired side direction. The angle α, β, θ conditions are determined, taking the flow analysis results in the bag filter dust collector into account, and is not a mere matter of design modification.

Furthermore, the side discharge holes 150*b* may be vertically symmetrical with regard to the horizontal plane P. That is, the side discharge holes 150*b* may be formed at two (upper and lower) locations with respect to the horizontal plane P. As the air supply pipe 140*a* and the air supply pipe 140*b* are symmetrical, the same description is applied to the air supply pipe 140*a* and the side discharge hole 150*a*.

In this embodiment, the side discharge hole 150*a*, 150*b* has a slit shape with a constant size to the end of the air supply pipe 140*a*, 140*b*. Although FIG. 3 cites, as an example, the case in which the end of the air supply pipe 140*a*, 140*b* is closed and the air supply pipe 140*a*, 140*b* has the end discharge hole 152*a*, 152*b*, the end of the air supply pipe 140*a*, 140*b* may be closed so that contaminated air may be only blasted through the side discharge hole 150*a*, 150*b*, and the end of the air supply pipe 140*a*, 140*b* may be open. The side discharge hole 150*a*, 150*b* may extend to the end of the air supply pipe 140*a*, 140*b*, and may be completed before the end.

Figure 12:
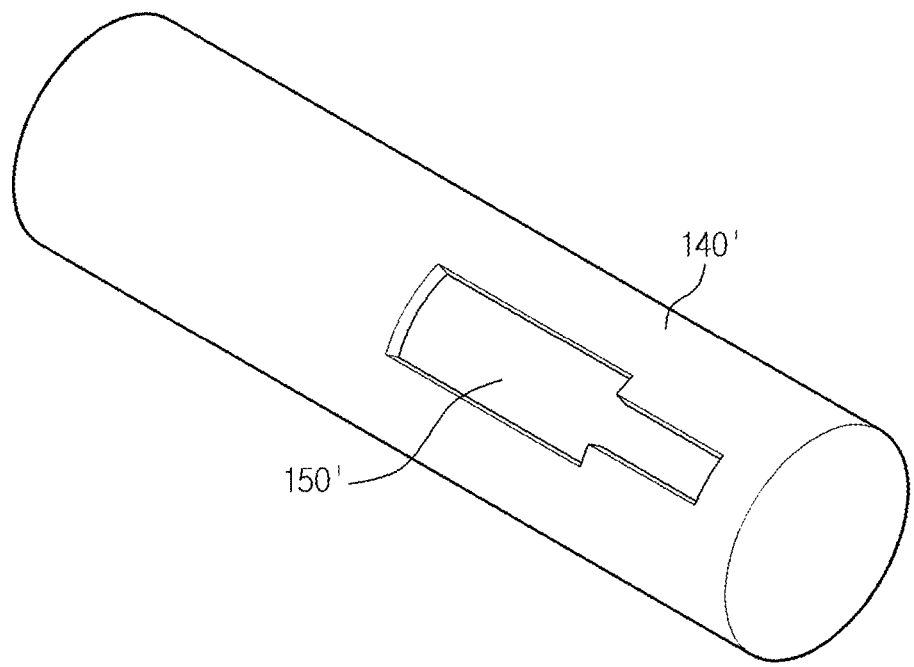
Figure 14:
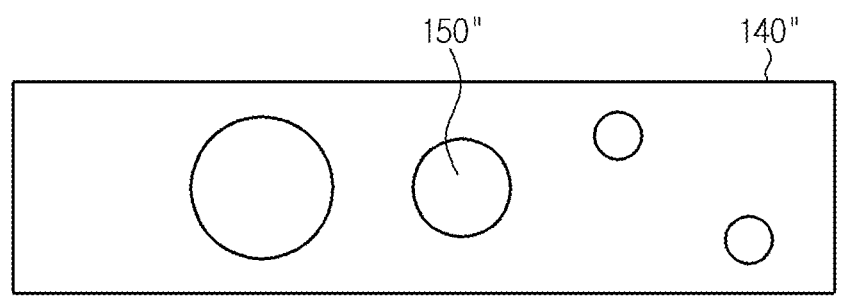

Meanwhile, the discharge hole may have the slit shape as well as other shapes, which are shown in FIGS. 12 to 14. FIGS. 12 to 14 are diagrams illustrating various examples of side discharge hole of air supply pipe of the bag filter dust collector according to an embodiment of the present disclosure.

Referring to FIG. 12, the side discharge hole 150' may have a tapered shape with the width becoming narrower as it goes toward the end of the air supply pipe 140'. The side discharge hole 150' may extend to the end of the air supply pipe 140', and may be completed before the end.

FIG. 13 shows the side discharge holes 150' of various tapered shapes.

In FIG. 13, (a) shows a shape in which the width is constant at the start but becomes narrower as it goes toward the end, and converges to a pointed tip. (b) shows a shape in which the width becomes narrower from the start toward the end and converges to a pointed tip. (c) shows a shape in which the width becomes narrower from the start toward the end but has a constant width. As described above, various modifications may be made to the shape of the side discharge hole 150' with the width becoming narrower as it goes toward the end, for example, the width may become narrower either discontinuously as shown in FIG. 12 or continuously as shown in FIG. 13, or both.

Referring to FIG. 14, the side discharge hole 150" may be multiple circular openings with the diameter reducing as it goes toward the end of the air supply pipe 140". The circular openings may be formed by punching.

Figure 15:
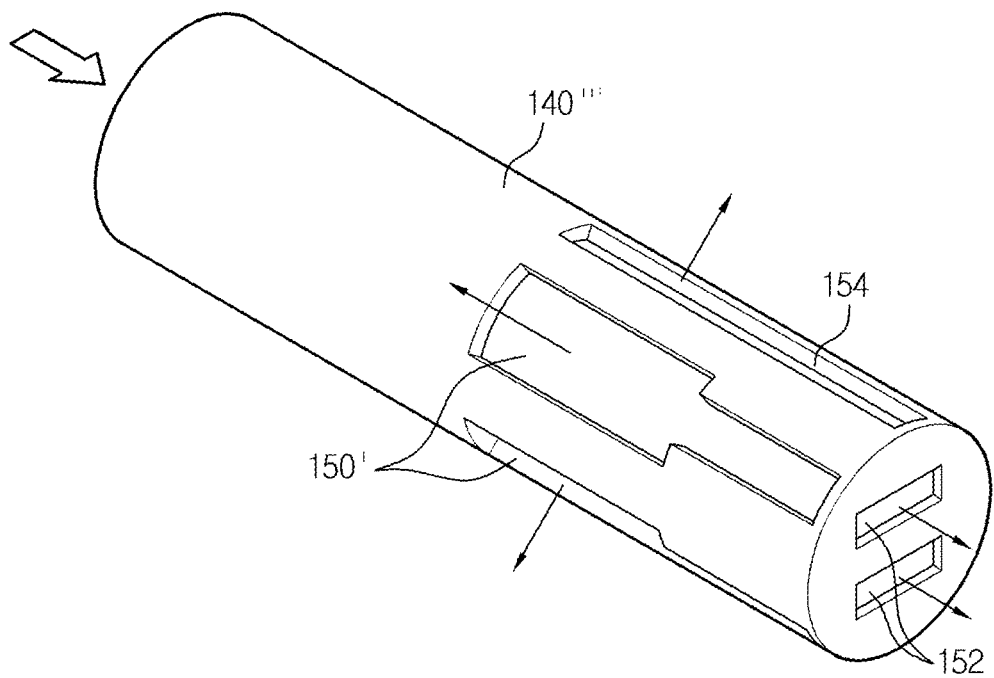
FIG. 15 is a diagram illustrating end discharge hole and top slit opening of air supply pipe of a bag filter dust collector according to an embodiment of the present disclosure.

FIG. 15 is a diagram illustrating end discharge hole and top slit opening of air supply pipe of a bag filter dust collector according to an embodiment of the present disclosure. The air supply pipe 140''' embodiment of FIG. 15 includes the side discharge hole 150' as an example of the side discharge hole as described with reference to FIG. 12.

The embodiment referring to FIG. 3 describes the example in which the end discharge hole 152*a*, 152*b* is included in the end of the air supply pipe 140*a*, 140*b*. The air supply pipe 140''' embodiment of FIG. 15 shows an example in which two end discharge holes 152 are formed side by side in the vertical direction. There is no limitation on the shape or number of the end discharge hole 152 if the condition that allows the end discharge hole 152 to play a role in removing dust by blasting air in the flow direction as well is satisfied.

Furthermore, the air supply pipe 140''' further has a top slit opening 154 at the top center on the side surface to prevent dust build-up on the top of the outer wall of the air supply pipe. The top slit opening 154 is preferably formed in the shape of an elongated slit under the concept of elimination of the place where dust will build up.

Figure 16:
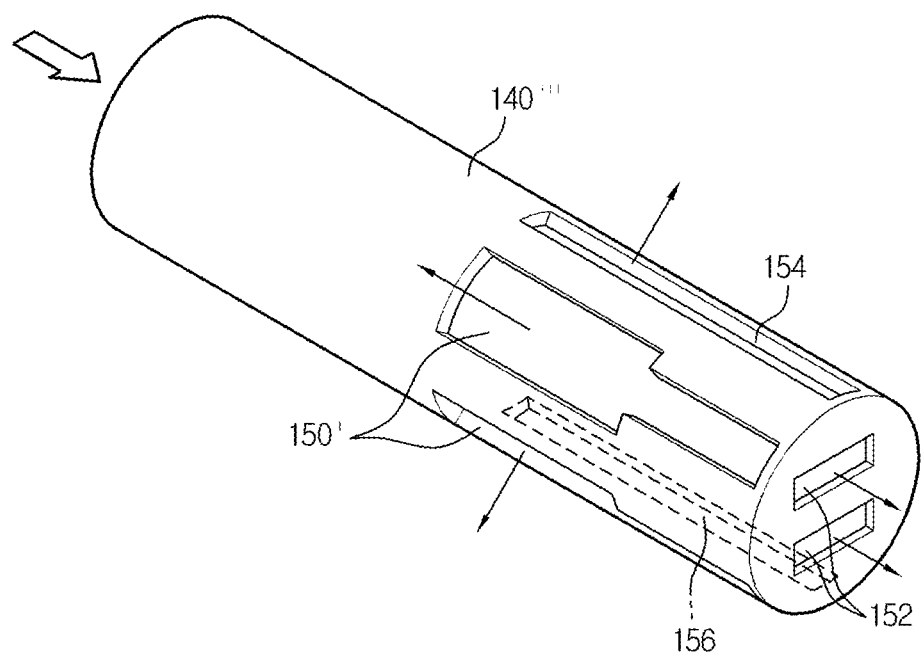
FIG. 16 is a diagram illustrating another preferred example of air supply pipe of a bag filter dust collector according to an embodiment of the present disclosure.

FIG. 16 is a diagram illustrating another preferred example of air supply pipe of a bag filter dust collector according to an embodiment of the present disclosure.

The air supply pipe 140''' embodiment of FIG. 16 further includes a bottom slit opening 156 as described with reference to FIG. 15. The bottom slit opening 156 is for preventing dust build-up on the bottom of the inner wall of the air supply pipe 140'''.

In the embodiments as described hereinabove, the air supply pipes 140 are installed side by side in the horizontal direction on one surface of the lower case 130, and the air supply directions match with each other. The air supply directions may be opposite to each other as in the following embodiment.

Figure 17:
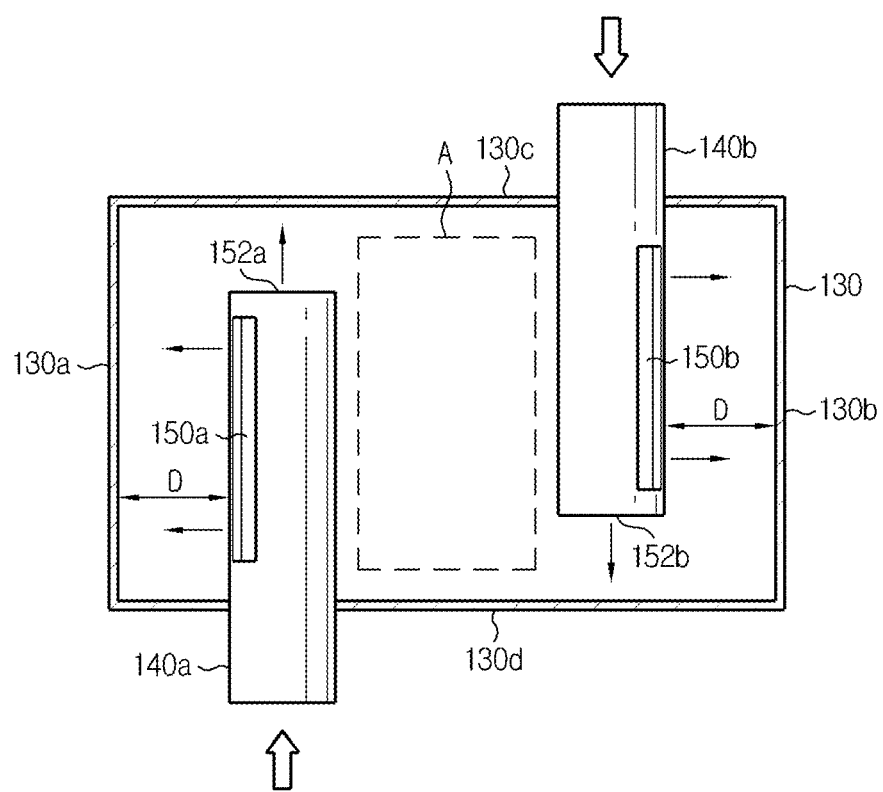
FIG. 17 is a plane view illustrating air blast from air supply pipe of a bag filter dust collector according to another embodiment of the present disclosure.

FIG. 17 is a plane view illustrating air blast from air supply pipe of a bag filter dust collector according to another embodiment of the present disclosure.

Referring to FIG. 17, the air supply pipes 140 are installed, each one on the opposing surfaces of the lower case 130, and the air supply directions are opposite to each other.

That is, the air supply pipe 140a is installed such that it goes through one surface 130d of the lower case 130, and the air supply pipe 140b is installed such that it goes through the surface 130c of the lower case 130 opposite to the surface 130d. The air supply pipes 140a, 140b are parallel to each other, but their air supply directions are opposite to each other. Except that the air supply directions of the air supply pipes 140a, 140b are opposite to each other, the description of the previous embodiment may be equally applied to this embodiment.

As shown in FIG. 17, air blast from the air supply pipes 140a, 140b is directed toward the wall of the side surface of the bag filter dust collector as described previously (solid arrow). According to the configuration such as above, air is only blasted to the wall of the bag filter dust collector and is not blasted to the central space A between the air supply pipes 140a, 140b.

After air blast from the air supply pipes 140a, 140b goes toward the wall of the side surface of the bag filter dust collector, air strikes the wall of the bag filter dust collector, generating a rotational flow, and the central space A between two or more air supply pipes 140a, 140b becomes a dust fall zone.

Hereinafter, an excellent preventive effect of the present disclosure on dust build-up will be described through flow analysis results of the present disclosure and comparative example.

Figure 18:
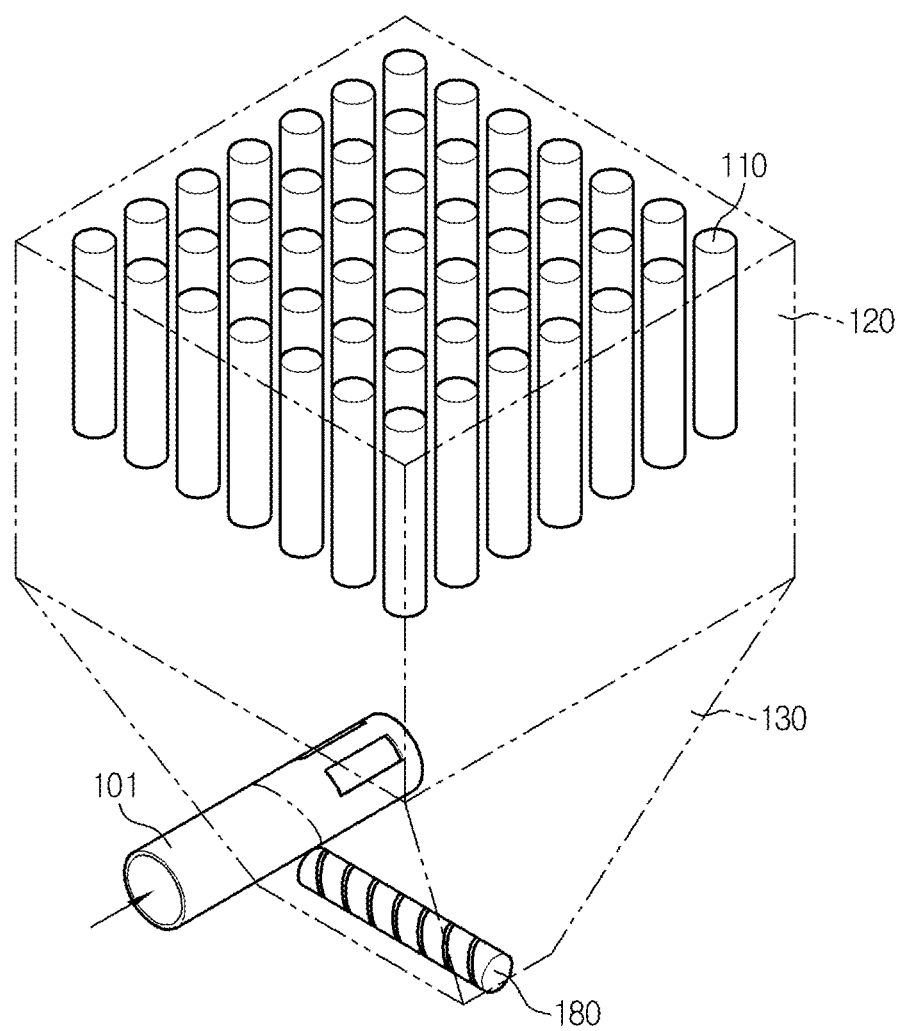
FIG. 18 is a perspective view of a bag filter dust collector according to comparative example.
Figure 19:
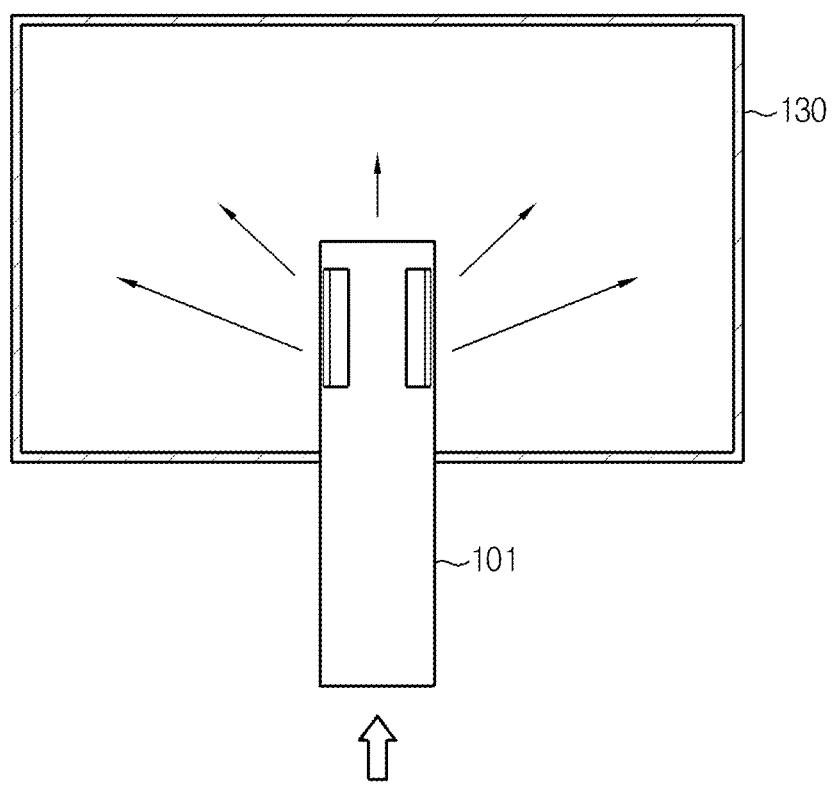
FIG. 19 is a plane view illustrating air blast from air supply pipe of a bag filter dust collector according to comparative example.
Figure 20:
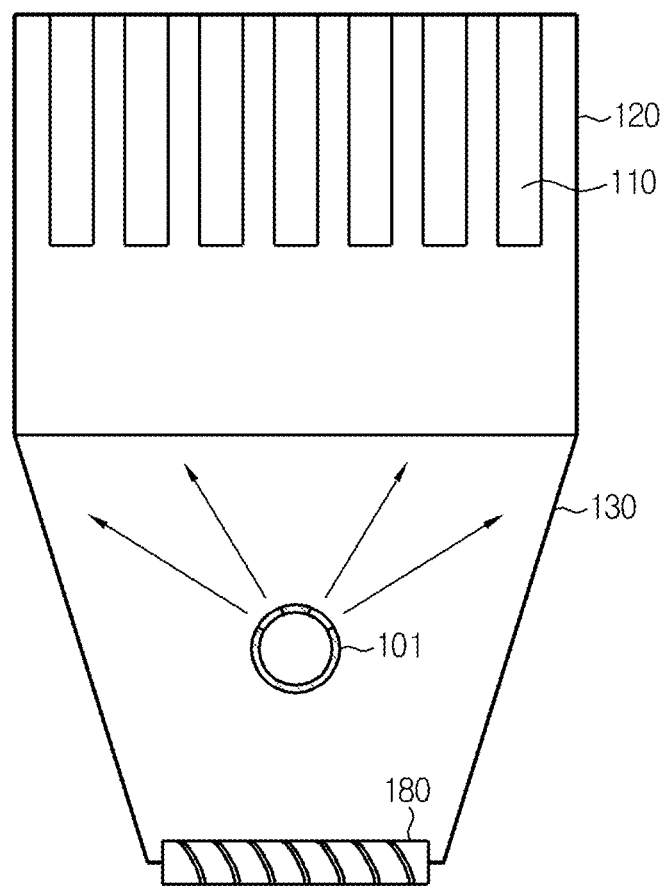
FIG. 20 is a front view illustrating air blast from air supply pipe of a bag filter dust collector according to comparative example.

FIGS. 18 to 20 show comparative example; FIG. 18 is a perspective view of a bag filter dust collector according to comparative example, FIG. 19 is a plane view illustrating air blast from air supply pipe of a bag filter dust collector according to comparative example, and FIG. 20 is a front view illustrating air blast from air supply pipe of a bag filter dust collector according to comparative example. FIG. 18 corresponds to FIG. 3, FIG. 19 corresponds to FIG. 4, and FIG. 20 corresponds to FIG. 5.

The bag filter dust collector according to comparative example has only one air supply pipe 101, and the air blast direction is radial. As air is radially blasted, air is blasted to the wall and in a forward direction, and accordingly, the bag filter dust collector according to comparative example is vulnerable to dust build-up on the wall of the lower case 130.

Figure 21:
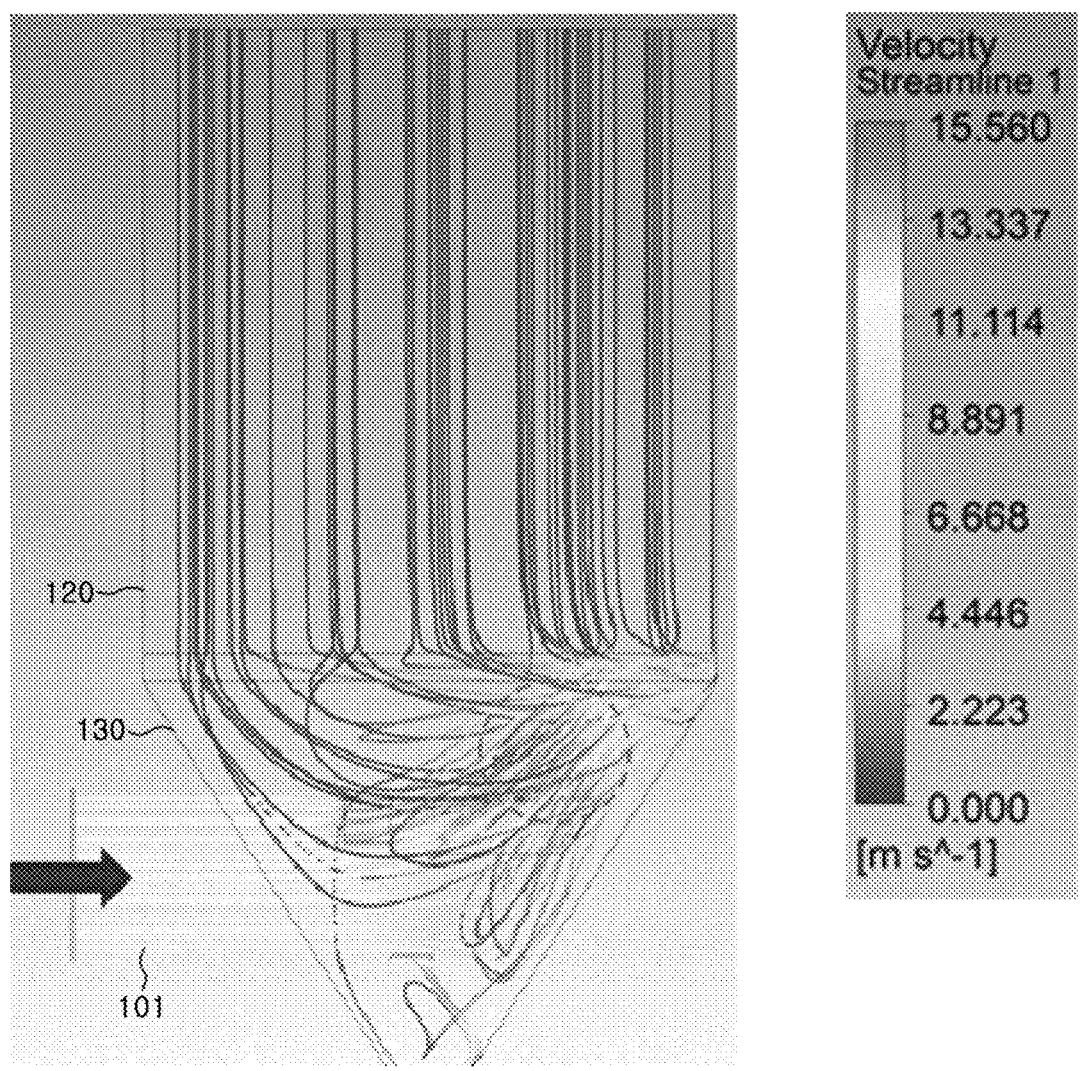
FIG. 21 is a flow analysis diagram of the side of a bag filter dust collector according to comparative example.
Figure 22:
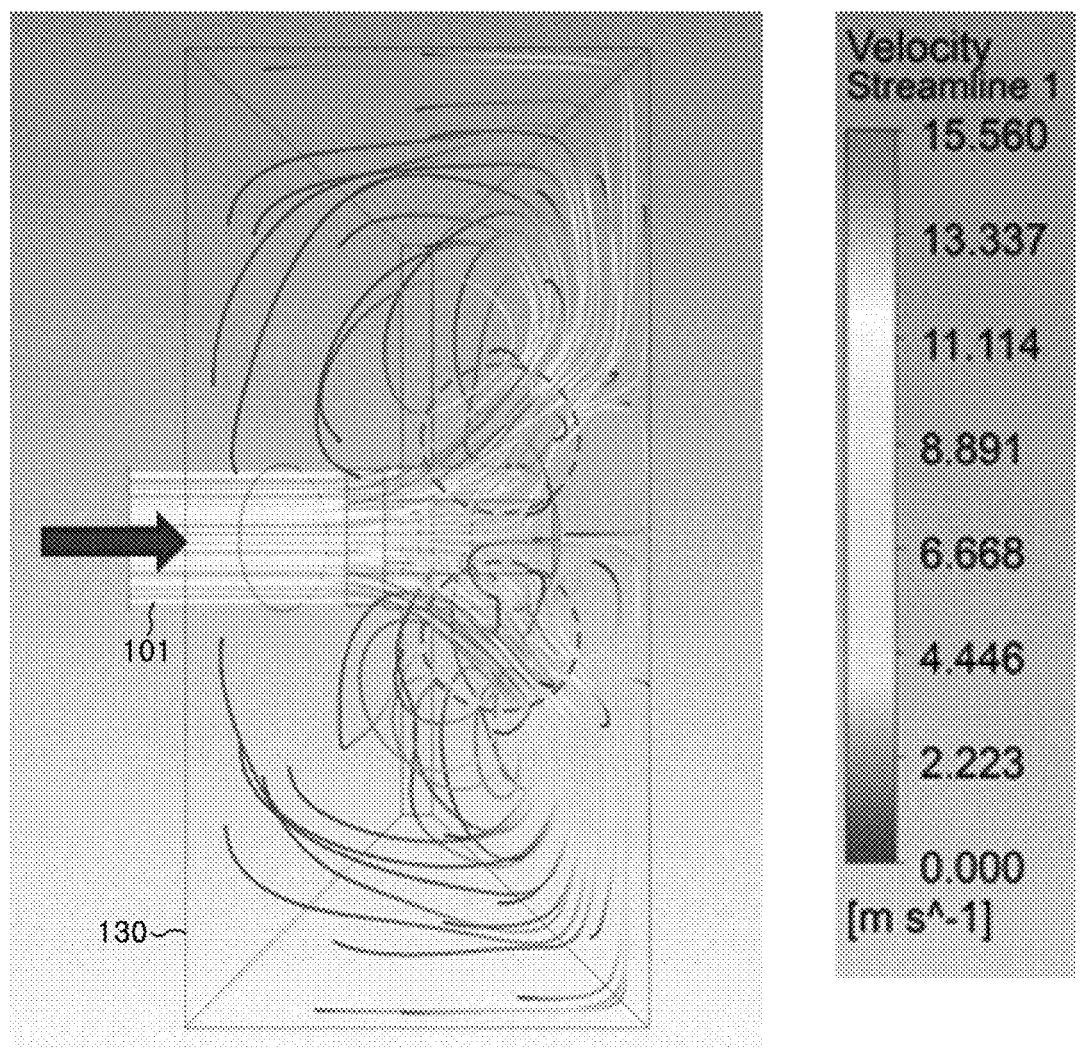
FIG. 22 is a flow analysis diagram of the top of a bag filter dust collector according to comparative example.

FIG. 21 is a flow analysis diagram of the side of a bag filter dust collector according to comparative example, and FIG. 22 is a flow analysis diagram of the top of a bag filter dust collector according to comparative example.

When only one air supply pipe 101 is provided and the air blast direction is radial, it can be seen from the flow analysis results as in FIGS. 21 and 22 that a focused blast of air is provided to a region (in a dotted circle, velocity is close to 15.560 ms$^{-1}$) due to non-uniform air blasts. When a focused blast of air is provided to only certain walls in the bag filter, dust does not build up on the area to which a focused blast of air is delivered, but dust builds up on the walls to which air is not blasted. Furthermore, if the air supply pipe 101 is provided at the center of the bag filter, it can be seen that a strong rising flow is generated at the front area of the center and the flow rate at the peripheral area is low so that dust falls down to the peripheral area and builds up on the wall.

Figure 23:
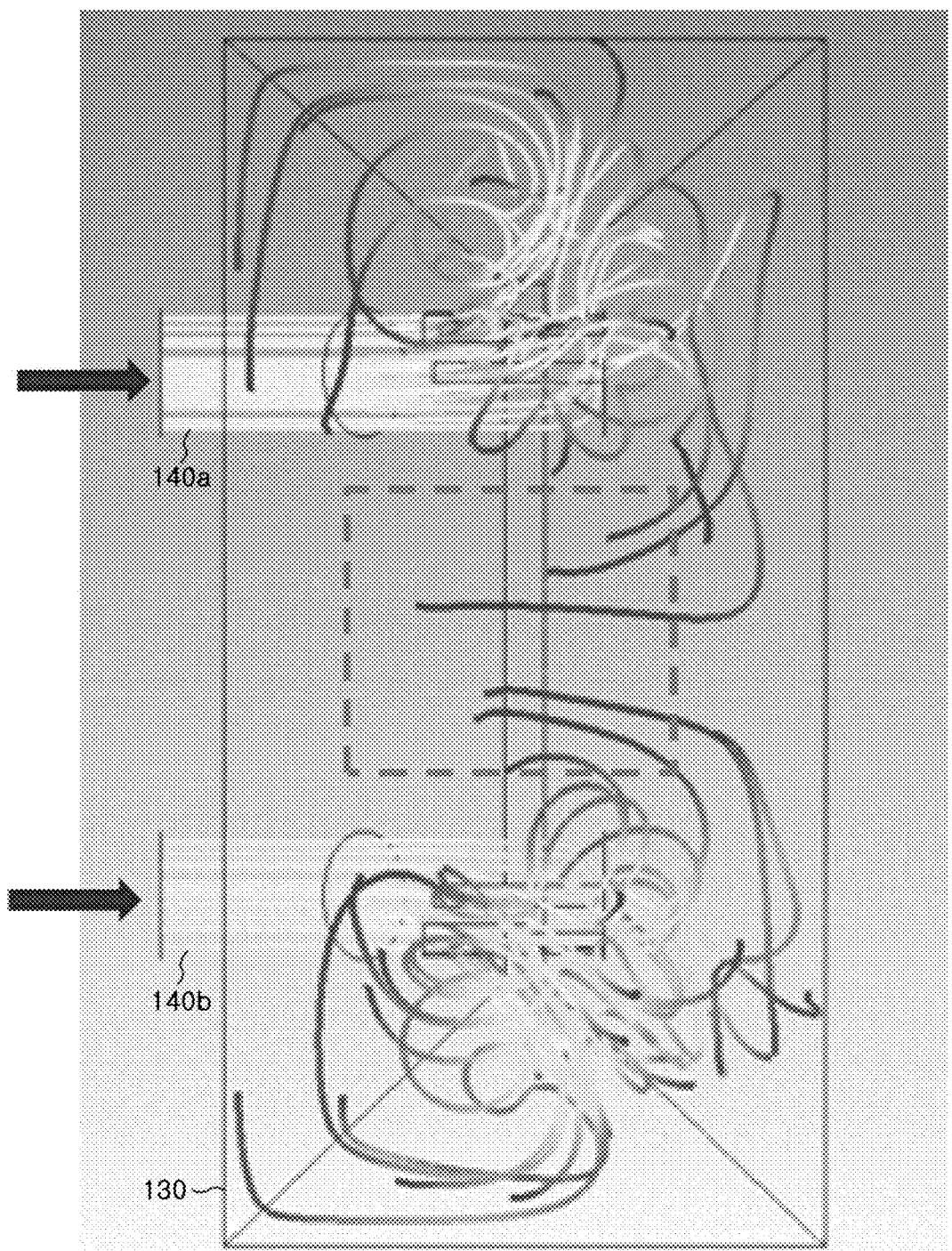
FIG. 23 is a flow analysis diagram of the top of a bag filter dust collector according to an embodiment of the present disclosure.
Figure 24:
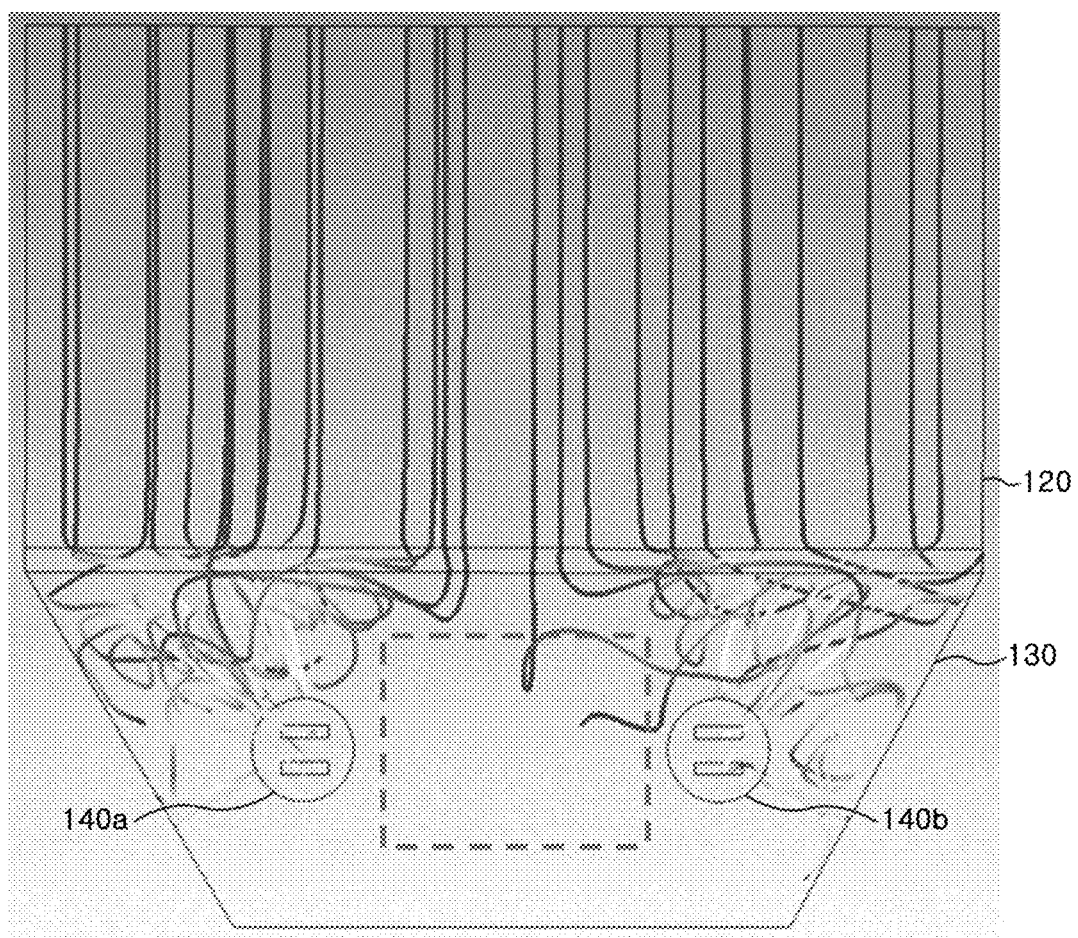
FIG. 24 is a flow analysis of the front of a bag filter dust collector according to an embodiment of the present disclosure.

FIG. 23 is a flow analysis diagram of the top of a bag filter dust collector according to an embodiment of the present disclosure, and FIG. 24 is a flow analysis of the front of a bag filter dust collector according to an embodiment of the present disclosure. When two air supply pipes 140a, 140b are positioned on the two sides to blast air to the side surface wall and the front surface wall as in the present disclosure, it can be seen that a focused blast of air is not provided to a specific region, and dust build-up on the inner wall can be prevented. Two end discharge holes are assumed as in FIG. 15. Particularly, as best shown in the streamline flow viewed from the top, as the air supply flow is blasted to the wall of the peripheral area, the flow rate of the neighborhood increases, generating a strong rotational flow, which makes it possible to remove dust from the wall of the side surface.

As such, the flow analysis demonstrates the presence of the zone (dotted box) in which dust falls down to the outlet beneath, without touching the wall, because the flow rate at the central part between the air supply pipes 140a, 140b is low. As described above, according to the present disclosure, while removing dust, forcing dust to be collected at the center and dislodged provides an effect in preventing dust build-up.

Figure 25:
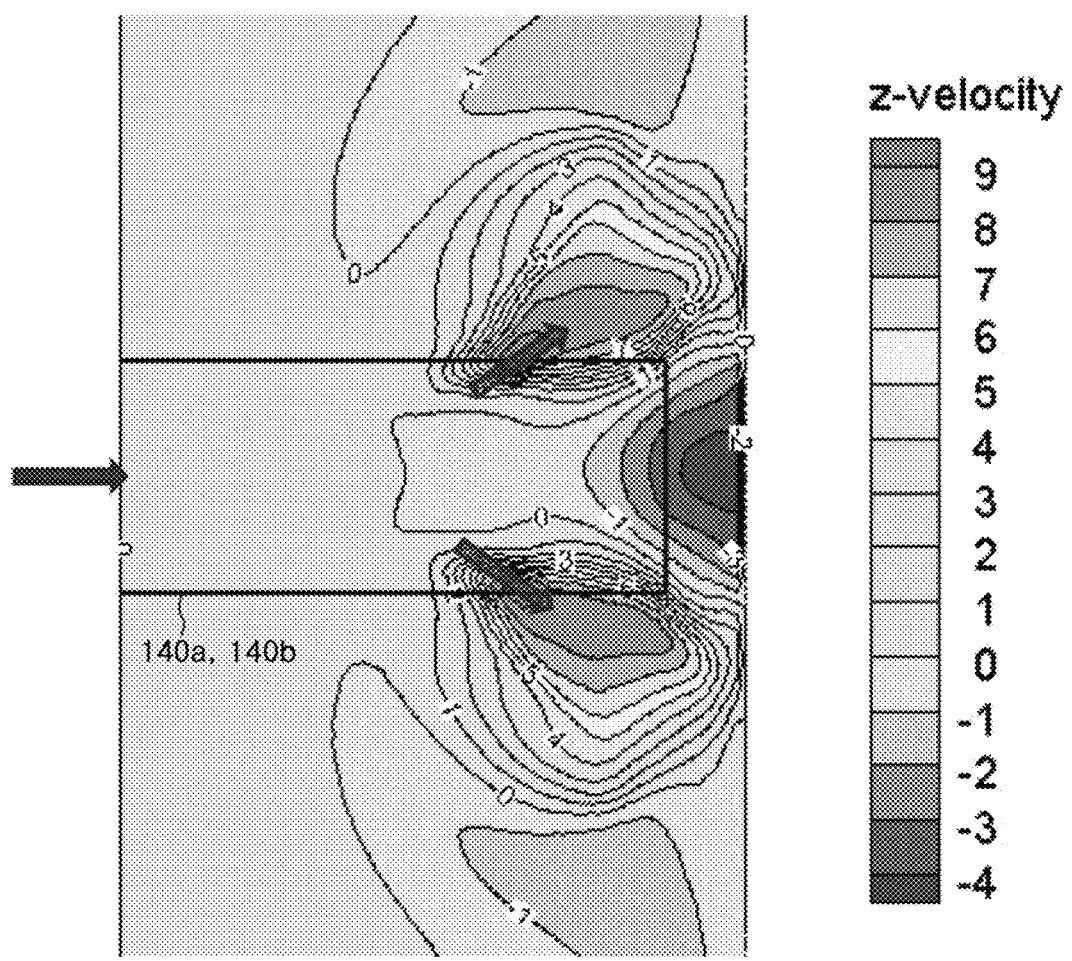
FIG. 25 is a flow analysis diagram of the side of a bag filter dust collector according to an embodiment of the present disclosure, with the side discharge hole described with reference to FIGS. 9 to 11.

FIG. 25 is a flow analysis diagram of the side of a bag filter dust collector according to an embodiment of the present disclosure, with the side discharge hole as described with reference to FIGS. 9 to 11. When each side discharge hole 150a or 150b of the air supply pipe 140a or 140b is formed at two (upper and lower) locations as in FIGS. 9 to 11, and has a slit shape satisfying the conditions of location of the opened part and the angles α, β, θ, it can be seen that a focused blast of air is provided in the flow direction and air is un-uniformly blasted to the wall of the side surface. The z-velocity at the location (arrow) of each side discharge hole 150a or 150b is strong close to 9, and gradually reduces to −1 along the flow direction.

Accordingly, as described with reference to FIGS. 12 to 14, when the side discharge hole of the air supply pipe configured to blast air to the side surface has a smaller size as it goes toward the end of the air supply pipe, a focused blast of air is not provided in the flow direction and air is uniformly blasted to the wall of the side surface.

While the preferred embodiments of the present disclosure have been hereinabove illustrated and described, the present disclosure is not limited to the disclosed preferred embodiments, and it is obvious to those skilled in the art that various modifications can be made to the embodiments without departing from the essence of the present disclosure to which the appended claims are entitled and such modifications fall within the scope of the appended claims.

What is claimed is:
1. A bag filter dust collector comprising:
an upper case comprising multiple bag filters configured to filter out dust, the multiple bag filters are installed in a vertical direction within the upper case;
a lower case formed at bottom of the upper case to collect dust falling from the bag filter; and
two or more air supply pipes parallel to each other to supply contaminated air into the bag filter dust collector through the lower case,
wherein the two or more air supply pipes are installed side by side in a horizontal direction within the lower case;
wherein the two or more air supply pipes have a side discharge hole on a side surface to direct air blast toward an inner wall of a side surface of the upper case or the lower case, and
wherein the two or more air supply pipes are closed on one side in a horizontal direction within the lower case forming a dust fall zone at a central space between the side surfaces of the two or more air supply pipes.

2. The bag filter dust collector according to claim 1, wherein the two or more air supply pipes are installed on the same surface of the lower case in air supply directions matching with each other.

3. The bag filter dust collector according to claim 1, wherein the two or more air supply pipes are installed, each one on opposing surfaces of the lower case, in air supply directions opposite to each other.

4. The bag filter dust collector according to claim 2, wherein the two or more air supply pipes are bent with ends facing each other in the bag filter dust collector.

5. The bag filter dust collector according to claim 4, wherein the two or more air supply pipes are integrally formed with the bent ends connected to each other.

6. The bag filter dust collector according to claim 5, wherein the two or more air supply pipes are configured to blast the contaminated air toward remaining surfaces of the lower case except the surface through which the air supply pipes go.

7. The bag filter dust collector according to claim 1, wherein the two or more air supply pipes have a cylindrical shape with a closed end, and further comprises an end discharge hole at the closed end to blast the contaminated air.

8. The bag filter dust collector according to claim 1, wherein the two or more air supply pipes further comprise a top slit opening to prevent dust build-up on top of an outer wall of the air supply pipe.

9. The bag filter dust collector according to claim 1, wherein the two or more air supply pipes further comprise a bottom slit opening to prevent dust build-up on bottom of an inner wall of the air supply pipe.

10. The bag filter dust collector according to claim 1, wherein the upper case is a quadrangular column, and the lower case has a smaller area as it goes downward.

11. The bag filter dust collector according to claim 10, wherein the surface of the lower case through which the two or more air supply pipes go is erect.

12. The bag filter dust collector according to claim 2, wherein when a length of the surface of the lower case through which the two or more air supply pipes go is L, the two or more air supply pipes are each positioned at a distance of between 0.1L and 0.3L from two side surfaces of the lower case.

13. The bag filter dust collector according to claim 1, wherein each side discharge hole is opened along the side surface from a first edge disposed at a first angle ranging between 20 degrees and 40 degrees to a second edge disposed at a second angle ranging between 40 degrees and 70 degrees, and the first and second angles are defined relative to a horizontal plane extending from a center of the air supply pipe toward an inner wall of a side surface of the lower case, and an angle of an opened part ranges from 20 degrees to 50 degrees.

14. The bag filter dust collector according to claim 13, wherein the side discharge holes of the two or more air supply pipes are vertically symmetrical with regard to the horizontal plane.

15. The bag filter dust collector according to claim 1, wherein each side discharge hole has a slit shape with a constant size to an end of the air supply pipes.

16. The bag filter dust collector according to claim 1, wherein each side discharge hole has a tapered shape with width becoming narrower as it goes toward an end of the air supply pipes.

17. The bag filter dust collector according to claim 1, wherein each side discharge hole is multiple circular openings with diameter reducing as it goes toward an end of the air supply pipes.

18. The bag filter dust collector according to claim 1, wherein the two or more air supply pipes are formed in proximity to a middle of a longitudinal length of the lower case.

19. The bag filter dust collector according to claim 1, further comprising: a purging device to purge dust built up in the bag filter.

20. The bag filter dust collector according to claim 1, wherein air blast is directed toward an inner wall of a side surface of the upper case or lower case by the two or more air supply pipes, and the blasted air strikes the inner wall of the side surface, generating a rotational flow into the bag filter dust collector.

\* \* \* \* \*